United States Patent Office 3,567,619
Patented Mar. 2, 1971

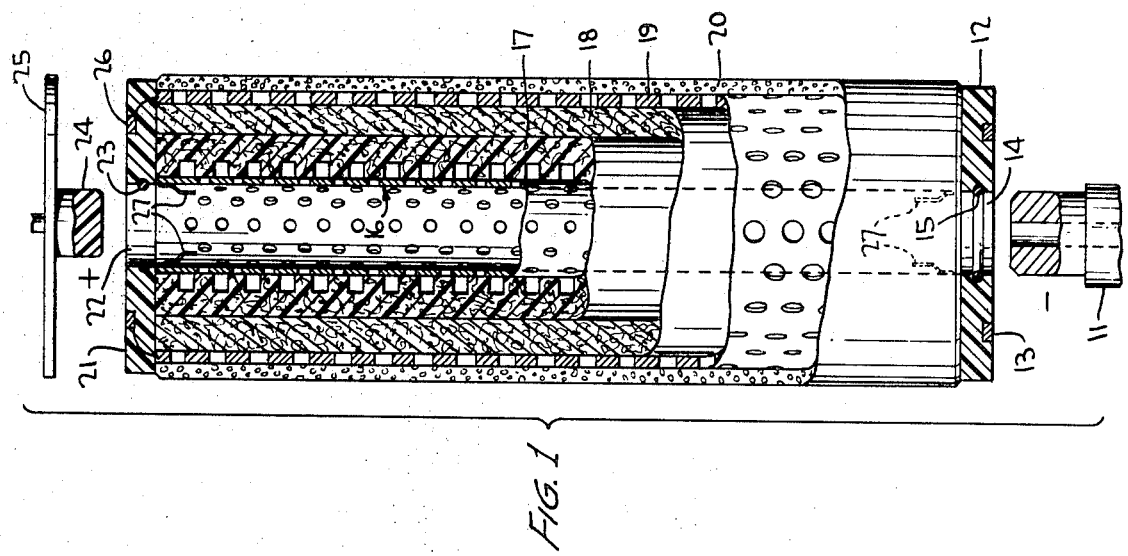

3,567,619
ELECTROSTATIC COALESCENCE MEANS
Robert N. Brown, Alexandria, Va., assignor to the United States of America as represented by the Secretary of the Army
Filed June 3, 1968, Ser. No. 734,033
Int. Cl. B01k *1/00;* B03c *5/02;* C10g *33/02*
U.S. Cl. 204—302
2 Claims

ABSTRACT OF THE DISCLOSURE

This invention relates to hydrocarbon fuel filtration and, more particularly, to electrostatic coalescence assisted filtration of solid and liquid contaminants from refined hydrocarbon fuels and non-water-soluble hydrocarbons such as those containing surface active additives. The contaminants are removed by including a first charged emitting screen electrode in the fluid flow with a conductive fibrous collecting bed downstream therefrom. The metallic coated fibers function substantially as a collecting electrode in the form of capillaries to attract very small particles of contaminants and cause them to collide with others to produce larger units, such as drops, thus increasing coalescence. The heavier, coalesced drops of water contaminants are drained off leaving the fuel substantially free of this contaminant. Solid contaminants are trapped and retained in a fibrous filter bed immediately upstream from the conductive fiber coalescing bed.

The invention described herein may be manufactured and used by or for the Government of the United States of America for governmental purposes without the payment to me of any royalties thereon.

FIELD OF THE INVENTION

This invention is in the class for electrostatic coalescence assisted filtration of contaminants from refined hydrocarbon fuels with surfactants added.

DESCRIPTION OF THE PRIOR ART

This invention lies in the field of technology exemplified by Carswell et al., U.S. Pat. 3,074,870, issued Jan. 22, 1963. Carswell et al., teaches the separation of a water in oil emulsion into its components by means of a corona wind discharge. This invention differs from Carswell et al., in that I have provided a collecting electrode with infinite conductive capillary surfaces for collecting and neutralizing charged particles of contaminant from a charge that is completely enclosed in the fuel instead of the gaseous atmosphere in a space occupied by the discharge electrode taught by Carswell et al.

SUMMARY

The invention of this disclosure is a device for removing aqueous and solid contaminants from hydrocarbon fuels to which have been added certain surface acting chemicals functioning as detergents or dispersants. This is accomplished by the introduction of a wire mesh emitting electrode as the first filter structure that the influent fuel contacts. This mesh can be of aluminium, stainless steel, etc., and is connected to high electrostatic voltage source and is adequately electrically isolated from all structure other than the fuel. A non-conductive fibrous filter bed is next downstream from the emitting electrode which serves the dual function of filtering solid particles from the fuel stream and acting as an insulated space between the emitting electrode and the collecting electrode which is the next downstream element. The collecting electrode is connected to the opposite polarity of the high voltage source. Means are provided to physically support these elements. The coalesced liquids are heavier than the cleaned fuel and fall under the force of gravity to the bottom of the effluent compartment of a containing vessel.

The deleterious effect of the surfactants in a hydrocarbon fuel are caused by changes in surface energy and interfacial relationship, and result in the prevention of coalescence. This effect is overcome by charging of each particle to one polarity and passing such particles through a conductive bed of opposite polarity. The provision of an effectively infinite conductive bed enables this filter/coalescer system to be exceptionally efficient. The system of this invention has the capability of rapid separation of a water-in-oil emulsion into its separate phases in a relatively small volumetric space. Further, this invention is effective in separating into separate phases a water-in-oil emulsion containing surfactants as well as removing the very fine solid contaminants from a hydrocarbon fuel.

It is, therefore, an object of this invention to provide a filter/coalescer system which is exceptionally efficient.

Another object of this invention is to provide a filter/coalescer system that makes use of ionic bombardment in order to promote coalescence.

Still another object of this invention is to provide a filter/coalescer with an effectively infinite conductive bed for improving the coalescing operation.

A further object of this invention is to provide a coalescer which will effectively separate water-in-oil emulsion into its separate phases even after treatment with surfactant type additives.

A still further object of this invention is to provide a filter/coalescer which also is capable of removing small solid contaminants from a hydrocarbon fuel.

The exact nature of this invention as well as other objects and advantages thereof will be readily apparent from consideration of the following specification relating to the annexed drawings in which:

BRIEF DESCRIPTION OF THE DRAWINGS

FIG. 1 shows a first modification of the filter/coalescer of this invention, and FIG. 2 shows a second modification of this invention.

DESCRIPTION OF A PREFERRED EMBODIMENT

Turning now to the drawings, FIG. 1 shows the embodiment of my invention as a filter/coalescer cartridge. The ingress of the water-in-oil emulsion treated with surfactants is through inlet spud 11. Spud 11 is insulated from the container tank which holds the cartridge and is connected electrically to an electrostatic voltage source. This spud can be a part of the distribution spider accommodating several cartridges, as desired. The bottom and top end caps 12 are provided with an annular grounding strip 13 for grounding the conductive-fiber media. A centrally located aperture 14 is provided in bottom and top end caps 12 for the insertion of spud 11, and O-ring sealing means 15 is provided to provide a seal. The innermost structure of the cartridge is a metal emitter cylinder 16 to which is electrically connected to ingress spud 11 by metal spring contacts 27. The perforations in emitter 16 are of such a size as to expose a large area of electrical contact with the fluid and also provide for a minimum drop in pressure for the fluid passing therethrough. Surrounding emitter cylinder 16 is a second cylinder 17 made of molded non-conducting fiberglass. The inner surface of cylinder 17 is serrated so as to provide a maximum service area for isolating solid contaminants from the fuel and also to provide for spacing of the emitter cylinder 16 from a third cylinder 18 which surrounds cylinder 17. Cylinder 18 is made of very fine fiberglass such as AA and is rendered conductive for treatment with a conductive material such as metallic silver, or tin for example. Surrounding the loosely packed infinite-in-nature capillary paths formed in cylinder 18 is still another cylinder 19 which is electrically grounded perforated material cannister. The size of the perforations in cannister 19 is determined by the size of the coalesced water droplets passing therethrough. The openings should be sized such that the conductive fiberglass cylinder 18 is maintained in an integral state while permitting a minimum pressure drop of the fuel and coalesced aqueous contaminants passing therethrough. A sleeve 20 of urethane sponge material for example can be added to surround the cannister 19 for further coalescing activity. After the cleaned fuel and the coalesced substance pass through the cannister, the heavier coalesced substance will fall by force of gravity to the lower part of the containing tank, not shown, and can be drained from lower part of container. The cleaned fuel rises and is available at the top of the foresaid container. A second plastic end cap 21 is placed at the top of the element as viewed in FIG. 1 and is provided with a central aperture 22 in which is mounted an O-ring 23 to make a sealed contact with the plastic plug 24 inserted in said aperture 22. Plastic plug 24 is an insulator and is connected to an aluminium cap 25 which is electrically grounded to the containing tank. In the top plastic end cap 21 is an annular grounded strip 26 to which the grounded perforated metal cannister 19 is electrically connected so as to complete the electrical circuit to the end cap 25 and the tank walls.

The coalescing operation of this invention is successful because the particles in the flowing fuel are charged by an electric field having lines of force aligned with the direction of flow to such a degree that the aqueous contaminants are isolated even though surfactants are present with their function of preventing coalescence. The space between the emitter or charging electrode 16 and the grounded cannister 19 is of a magnitude sufficient to significantly charge the contaminant particles. The conductive fiberglass bed 18 acts as an infinite number of grounded capillaries which attract and agglomerate the charged particles thus improving coalescing efficiency. As is well known, the attachment of minute water droplets to fibers in a capillary network cause other droplets to contact and coalesce with them thus producing large drops which stream through the collecting bed and fall by gravity to the bottom of the containing vessel. The invention provides for an exceptionally high removal of aqueous contaminants.

The embodiment shown in FIG. 2 reveals a fuel flow system similar to that of FIG. 1 but in a different configuration. Instead of the fiber/coalescent structure being in cylindrical form, the modification in FIG. 2 shows the structure in planar form. The first part to be encountered by the contaminated fuel is a wire mesh emitting electrode 31 which is equivalent to the perforated metal emitter 16 in FIG. 1. An annular plastic spacer 32 is provided so as to enable a separation of the electrical elements as to provide an optimum distance for the contaminant particles to be in contact with the electrostatic charging field. The solid contaminants are accumulated in a non-conductive coarse fiberglass 33. The aqueous contaminants are coalesced in a very fine conductively coated, fiberglass collecting mat electrode 34 which has the same capillary activity as cylinder 18 in FIG. 1. A perforated electrically grounded outer plate 35 supports and grounds the fibrous collecting electrode 34 and permits the passage of coa-lesced contaminants and cleaned fuel. A urethane sponge material 36 can be included to further increase coalesced drop size. It is seen that the coalesced aqueous contaminants can be drained through drain 37 of the coalescent chamber 40 while the clean fuel can go out through outlet 38. A hydrophobic filtering screen 39 such as Teflon coated mesh can be put in the effluent flow stream to act as a water barrier, preventing the escape of any fine water droplets with the clean fuel.

In an example of operation, when a charge of 10 kilovolts was applied across the cell for 15 minutes all but 4 p.p.m. (parts per million) of water was removed from a flowing fuel stream containing 1% of water contaminant. The filter bed was AA fiberglass coated with metallic silver and offered a conductive flux path of approximately ¼ 0 inch.

Obviously many modifications and variations of the present invention are possible in the light of the above teachings. It is therefore to be understood, that within the scope of the appended claims, the invention may be practiced otherwise than as specifically described.

What is claimed is:
1. In combination a filter/coalescer comprising:
  container means constructed and arranged to have a hydrocarbon fuel flow passageway therethrough;
  first porous metallic grid electrode means disposed transverse to said passageway to receive all of said fuel flowing therethrough;
  porous electrically nonconducting, spacer means disposed transverse to said passageway downstream from said first electrode means;
  a relatively coarse porous filter means disposed transverse to said passageway, downstream from said spacer means for removing solid contaminants;
  a second porous metallic electrode means disposed transverse to said passageway, downstream from said filter means, said second electrode means comprising a body of relatively fine strand metallic coated fiberous material adapted to provide a capillary path of sufficient length to effect coalescence;
  means for electrically energizing said first and second electrode means to produce an electric field between said first and second electrodes;
  and means for disposal of coalesced contaminants in the hydrocarbon fuel.
2. The combination as defined in claim 1 wherein said first and second electrode means have a planar configuration, said fiberous material of said second electrode means is glass fiber, and said means for disposal of coalesced contaminants is a coalescent chamber with drain means disposed in the lower region thereof.

References Cited
UNITED STATES PATENTS

| 2,616,165 | 11/1952 | Brennan | 204—290X |
| 3,252,885 | 5/1966 | Griswold | 204—302 |
| 3,415,735 | 12/1968 | Brown et al. | 204—302 |

TA-HSUNG TUNG, Primary Examiner

N. A. KAPLAN, Assistant Examiner

U.S. Cl. X.R.

204—188